United States Patent
Liu et al.

(10) Patent No.: US 9,875,757 B1
(45) Date of Patent: Jan. 23, 2018

(54) ADJUSTING TRACK WIDTH TO COMPENSATE FOR OFFSET WRITING OF A TRACK

(71) Applicant: Seagate Technology LLC, Cupertino, CA (US)

(72) Inventors: Xiong Liu, Singapore (SG); Quan Li, Singapore (SG)

(73) Assignee: SEAGATE TECHNOLOGY LLC, Cupertino, CA (US)

(*) Notice: Subject to any disclaimer, the term of this patent is extended or adjusted under 35 U.S.C. 154(b) by 0 days.

(21) Appl. No.: 15/347,111

(22) Filed: Nov. 9, 2016

(51) Int. Cl.
*G11B 5/09* (2006.01)
*G11B 5/17* (2006.01)
*G11B 20/12* (2006.01)

(52) U.S. Cl.
CPC ........... *G11B 5/09* (2013.01); *G11B 5/17* (2013.01); *G11B 20/1217* (2013.01); *G11B 2020/1238* (2013.01); *G11B 2020/1292* (2013.01)

(58) Field of Classification Search
None
See application file for complete search history.

(56) References Cited

U.S. PATENT DOCUMENTS

| | | | | |
|---|---|---|---|---|
| 4,303,951 A | * | 12/1981 | Hack | G11B 5/035 360/123.01 |
| 6,219,193 B1 | * | 4/2001 | Janz | G11B 5/012 360/55 |
| 6,445,521 B1 | * | 9/2002 | Schaff | G11B 5/012 360/31 |
| 7,170,837 B2 | * | 1/2007 | Mashimo | G11B 7/094 369/44.35 |
| 8,854,930 B1 | * | 10/2014 | Clinton | G11B 7/1263 360/125.32 |
| 8,867,153 B1 | | 10/2014 | Coker et al. | |
| 8,929,186 B1 | * | 1/2015 | Sharma | G11B 5/012 369/47.5 |
| 9,424,879 B1 | | 8/2016 | Li | |
| 2001/0022700 A1 | * | 9/2001 | Lacombe | G11B 5/022 360/68 |
| 2001/0050890 A1 | * | 12/2001 | Okamoto | G11B 7/005 369/59.24 |
| 2004/0252394 A1 | * | 12/2004 | Hamaguchi | G11B 5/59655 360/48 |
| 2007/0153410 A1 | * | 7/2007 | Hashizume | G11B 5/465 360/66 |
| 2012/0105994 A1 | | 5/2012 | Bellorado et al. | |
| 2012/0194945 A1 | * | 8/2012 | Gao | G11B 5/012 360/77.03 |

\* cited by examiner

*Primary Examiner* — Peter Vincent Agustin
(74) *Attorney, Agent, or Firm* — Hollingsworth Davis, LLC

(57) ABSTRACT

An offset from track center of a writer that is writing to a track of a magnetic recording medium is determined. A write current applied to a write coil of the writer is adjusted to compensate for the offset. The adjusting of the write current affects a width of the track.

20 Claims, 4 Drawing Sheets

ADJUSTING TRACK WIDTH TO COMPENSATE FOR OFFSET WRITING OF A TRACK

SUMMARY

The present disclosure is directed to adjusting track width to compensate for offset writing of a track. In one embodiment, an offset from track center of a writer that is writing to a track of a magnetic recording medium is determined. A write current applied to a write coil of the writer is adjusted to compensate for the offset. The adjusting of the write current affects a width of the track.

In another embodiment, an offset from track center of a writer that is writing to a track of a magnetic recording medium is determined. A laser power applied to a laser of the writer is adjusted to compensate for the offset. The adjusting of the laser power affects a width of the track.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

The present disclosure generally relates to data storage devices that utilize magnetic storage media, e.g., magnetic disks. Generally in such devices, data is recorded on concentric tracks that range from an inner diameter to an outer diameter. The disk may include pre-written servo marks that define the track locations, as well as provide other data. The servo marks can be written to the media prior to drive assembly, such as by a multiple disk writer (MDW). The servo marks can instead be written in the assembled hard drive using a technique called self-servo write (SSW). A servo control system reads the servo marks while performing reading and writing operations in order to position a read/write head over the tracks.

A servo control system deals with, among other things, a phenomena known as runout. Runout is deviation of the track from an ideal location around the center of the spinning disk. One type of runout is repeatable runout (RRO), which is caused by imperfections introduced during manufacture of the device. For example, RRO can be caused by imperfections in location of the servo marks on the media. If the RRO is not compensated for, the read/write head could experience severe tracking fluctuations in trying to read or write to the tracks defined by the servo marks. Because RRO can be measured and is predictable, the servo system can include features that correct for RRO. For example, an estimation of RRO can be used to create virtual tracks that are offset the as-written tracks defined by the servo mark locations.

Another type of runout is sometimes known as non-repeatable runout (NRRO). Unpredictable effects such as windage, thermal expansion, shock, vibration, random noise, etc., can cause NRRO. Because NRRO is unpredictable, the servo system attempts to deal with it through active control, e.g., by a closed-loop controller that measures location via the servo marks. For example, the servo marks can contain a burst pattern with different frequencies. The frequency components of the signal read from the burst marks can be used as a position error signal (PES) that is fed back to the servo controller.

Even with closed loop servo control, the write transducer cannot always be positioned to write data precisely along the centerlines of the tracks. For example, some disturbances may occur at a frequency that is beyond the effective frequency response of the mechanical actuator(s) that position the read/write head. In conventional recording, this can lead to an increase in adjacent track interference. In another type of recording known as shingled magnetic recording (SMR), off-center track writing can also affect track width. In the present disclosure, methods and apparatuses are described that can minimize the effects of high-frequency runout on track width in shingled recording. Such embodiments may also have applications in other types of recording, e.g., conventional, perpendicular magnetic recording.

Figure 1:
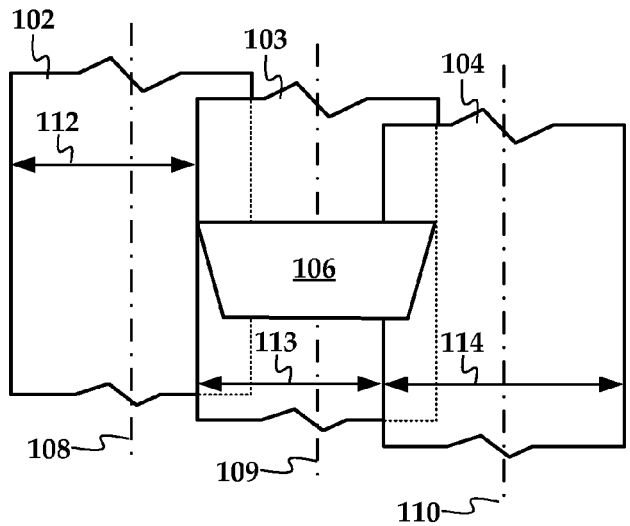
FIGS. 1, 2, and 3 are diagrams of recorded tracks according to example embodiments.

In FIG. 1, a block diagram illustrates an SMR track arrangement according to an example embodiment. Portions of three tracks 102-104 are shown, together with a writer 106 positioned over one track. Track 102 is written first, and then track 103 is then written partially overlapping track 102. Thereafter, track 104 is then written partially overlapping track 103. This can be repeated for any number of tracks, which are often treated as a group or band for purposes of updating. For example, track 102 cannot be changed without overwriting track 103. Generally, the data of overlapping tracks may be updated together if one or more overlapped tracks are changed.

The overlapping of tracks as shown in FIG. 1 allows shingled recording to produce narrow tracks using a relatively high-strength magnetic field. Note that all of the tracks 102-104 are initially written using the same effective width of the writer 106. However, after all tracks 102-103 are written, the tracks 102, 103 have respective widths 112, 113 that are narrower than originally written due to the overlapping of subsequently written tracks 103, 104. Assuming track 104 is the last track written in the band, it may have a width 114 that is wider than the other tracks 102, 103, e.g., corresponding to the full write width of writer 106.

Figure 2:
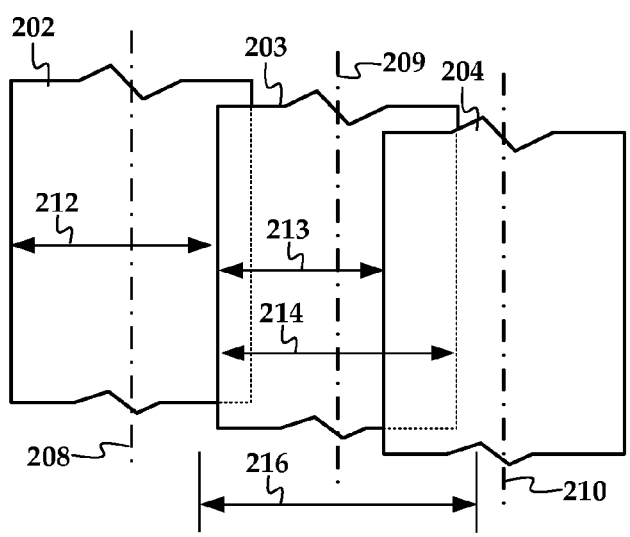
Figure 3:
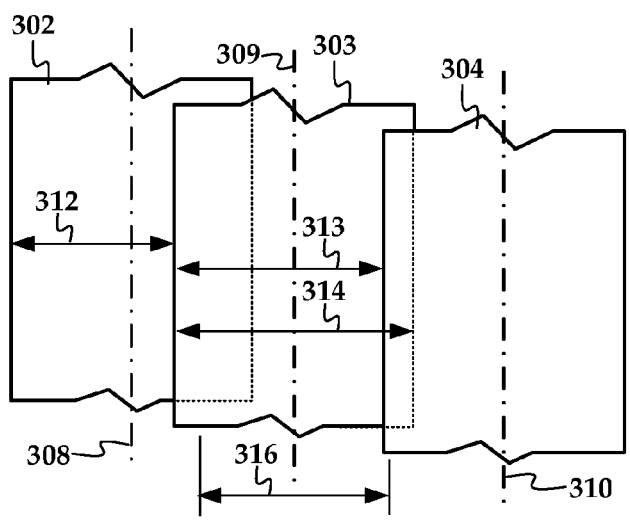

As noted above, location of track center, as indicated by centerlines 108-110 in FIG. 1, can have an effect on track width. It is assumed track centers 108-110 in FIG. 1 are evenly distributed, e.g., located at a nominal track pitch within desired tolerances. The diagrams in FIGS. 2 and 3 show how misalignment of the track centers can affect the track width in an SMR arrangement. In FIG. 2, shingled tracks 202-204 are written along centers 208-210, with center 209 being shifted to the right. This results in width 213 being less than corresponding width 113 in FIG. 1, and width 212 being greater than corresponding width 112 in FIG. 1. In FIG. 3, shingled tracks 302-304 are written along centers 308-310, with center 309 being shifted to the left. This results in width 313 being greater than corresponding width 113 in FIG. 1, and width 312 being less than corresponding width 112 in FIG. 1.

The servo control system may include mechanisms to compensate for the off-center tracking as shown in FIGS. 2-3. For example, each arm may include a microactuator (e.g., a piezoelectric actuator) that provides fine tracking adjustments to the read/write head. While this microactuator can respond at higher frequencies than a main actuator (e.g., a voice coil motor that rotates all of the read/write heads at once), microactuator response still may be limited at high frequencies. Embodiments described below can minimize the impact of mis-tracking on shingled (and in some case conventional) tracks. These embodiments involve changing a total width of the track as written by the writer to compensate for a track being off-center.

Figure 4:
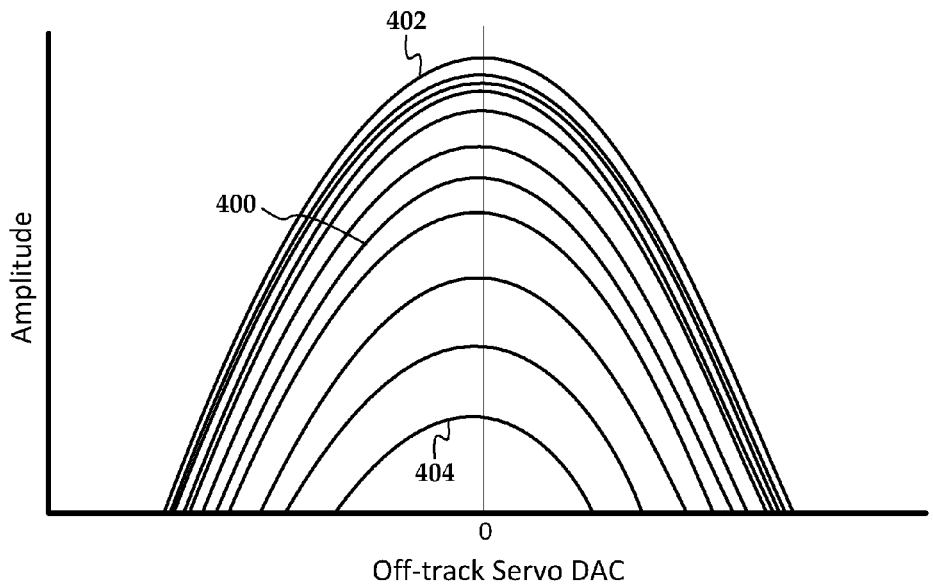
FIGS. 4 and 5 are diagrams of track width as a function of write current used in a method and apparatus according to an example embodiment.
Figure 5:
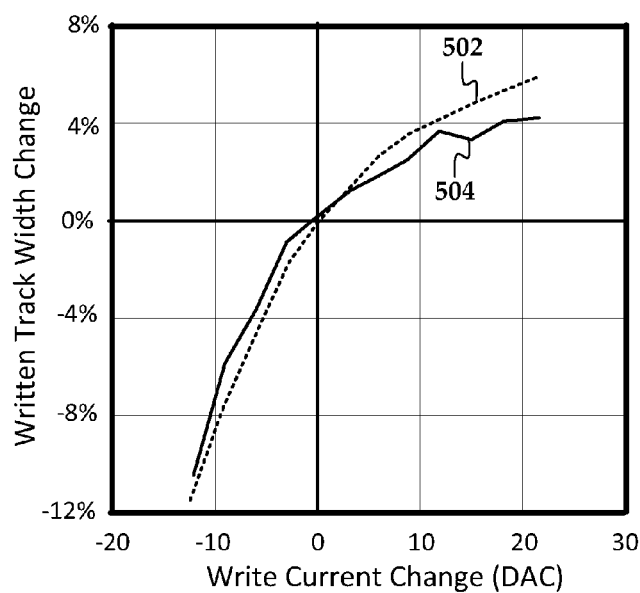

In FIGS. 4 and 5, graphs show how writer current sent, e.g., to a magnetic write coil, can change written track width in an apparatus according to an example embodiment. In FIG. 4, a graph shows bit-error rate (expressed as a positive value, a higher value indicating fewer bits in error) as a function of servo offset for various writer current inputs, the servo offset in FIG. 4 (and writer current in FIG. 5) being expressed as input to a digital-to-analog converter (DAC). Curve 400 indicates a nominal track profile, and the curves 402 to 404 represent crosstrack profiles that range from a maximum to minimum available writer current value. Curve 404 is the largest width written track and curve 402 is the narrowest width track, all achieved with the same writer but using different write currents. The graph in FIG. 5 shows a percentage change in track width from nominal (width of curve 400 in FIG. 4) as a function of writer current DAC. Curve 502 represents the amount of change of the left side of the track and curve 504 represents the amount of change of the right side of the track. As expected, the larger the write current, the wider the width of the written track, and smaller currents result in narrower tracks.

In an SMR drive, the track width changes due to changes in writer current as shown in FIGS. 4 and 5 can be used to compensate for off-center track writes. In reference again to FIG. 2, the center 209 of middle track 203 is offset to the right, which in this convention represents a positive offset in position error signal (PES) detected by the servo control system. All of the tracks would normally be written to the same, nominal width, as indicated by width 214. For this off-center track 203, the writer current would be increased, resulting in track 203 being written at larger width 216. This would result in left-side-adjacent track 202 being the correct width (e.g., as shown for track 102 in FIG. 1). Because the right-side-adjacent track 204 partially overlaps middle track 203 anyway, there is no adjacent track penalty on the right side for writing track 203 wide.

In reference again to FIG. 3, the center 309 of middle track 303 is offset to the left, which in this convention represents a negative offset in PES detected by the servo control system. For this off-center track 303, the writer current would be decreased, resulting in track 303 being written at width 316 that is smaller than nominal width 314. This would result in left-side-adjacent track 302 being the correct width (e.g., as shown for track 102 in FIG. 1). There should be no penalty if there is minimal overlap from the right-side-adjacent track 304.

Because the write current and writer can respond at higher frequencies than a microactuator, the writer can correct for high-frequency runout and other tracking errors. This can result in being able to achieve the desired areal density and prevent increases in bit error rate (BER) for tracks that would otherwise be written too narrowly, such as track 203 in FIG. 2 and track 302 in FIG. 3.

In order to validate the above-described method, a test run was performed on a disk drive that uses SMR. Generally, the test involved writing a first set of tracks without adjusting track width for offset tracks, e.g., without adjusting write current Iw. For each iteration of the test, the two left-side tracks n−2 and n−1 are written centered, the middle track n is written with a predefined track offset, then right-side tracks n+1 and n+2 are written centered. This is repeated for a set of track offsets, e.g., servo DAC offsets of −10, −5, 0, 3, and 10. After the tracks are written for each iteration, tracks n−1 and n are read and BER is recorded. The results are shown in Table 1 below. In the table, BER is expressed as a value n, where the ratio of bits in error is $10^{-n}$. Note that for negative servo offset, track n is wider and track n−1 is narrower, resulting in respective lower and higher BER; the converse is true for a positive servo offset.

TABLE 1

| No. | Iw Change (DAC) | PES Offset (Servo DAC) | Write PES (% TP) | Track n BER | Track n-1 BER |
|---|---|---|---|---|---|
| 1 | 0 | −10 | −3.9% | 1.96 | 1.82 |
| 2 | 0 | −5 | −2.0% | 1.93 | 1.87 |
| 3 | 0 | 0 | 0.0% | 1.90 | 1.90 |
| 4 | 0 | 3 | 1.2% | 1.87 | 1.92 |
| 5 | 0 | 10 | 3.9% | 1.81 | 1.97 |

In a second test taken under similar conditions, the above procedure was repeated, except that when the servo was offset in one direction (e.g., positive or negative), the write current was changed in the opposite direction (e.g., negative or positive) to compensate for the servo offset. The results of this second test are shown in Table 2 below. Note that BER in both adjacent tracks are lower and more consistent in Table 2 than in Table 1, indicating that adjusting the write current compensates for the servo offsets.

TABLE 2

| No. | Iw Change (DAC) | PES Offset (Servo DAC) | Write PES (% TP) | Track n BER | Track n-1 BER |
|---|---|---|---|---|---|
| 1 | 12 | −10 | −3.9% | 1.95 | 1.88 |
| 2 | 6 | −5 | −2.0% | 1.94 | 1.88 |
| 3 | 0 | 0 | 0.0% | 1.90 | 1.90 |
| 4 | −3 | 3 | 1.2% | 1.88 | 1.90 |
| 5 | −6 | 10 | 3.9% | 1.86 | 1.87 |

In the examples above, adjusting the write current includes at least adjusting the DC write current. Other write current parameters can be adjusted in addition to write current. For example, parameters such as current overshoot magnitude and current overshoot duration can be adjusted singly or in combination instead of or in addition to DC current value. The relationship between effective writer width and write current is determined during drive certification process and used for servo control design and calibration. The embodiments described herein can use that data to make adjustments during writing in response to off-center tracks being written.

In embodiments described herein, the adjusting of write current can be applied to any size of written data, including partial tracks and partial sectors. Because write width may be dependent on temperature, a thermal sensor may be used to compensate the write width change due to temperature. For example, a device may derive multiple curves as shown in FIG. 5 for different temperatures, and determine the appropriate write current change based both on the amount of position error and writer temperature.

Although embodiments are described herein using a dual-actuator system (voice coil motor and microactuator), in some embodiments, the ability to change track width using writer current may allow using a single-stage mechanical actuator, e.g., voice coil motor only, and using write width to compensate for small deviations. This can reduce cost and complexity, as well as improving operational shock performance due to reduced mass on the actuator arms due to the removal of the microactuator. As previously noted, the proposed scheme also can be applied to non-shingled recording arrangements under some conditions. For example, reducing of write current can prevent erasing adjacent tracks when a track is off-center.

While the above embodiments describe changing track width using a change in write coil current, in another type of magnetic storage known as heat-assisted magnetic recording (HAMR), track width is typically not changed by changing the strength of the applied magnetic field. In HAMR, also referred to as energy-assisted magnetic recording (EAMR), thermally-assisted magnetic recording (TAMR), and thermally-assisted recording (TAR), an energy source such as a laser creates a small hotspot on a magnetic disk during recording. The heat lowers magnetic coercivity at the hotspot, allowing a write transducer to change magnetic orientation, after which the hotspot is allowed to rapidly cool. Due to the relatively high coercivity of the medium after cooling, the data is less susceptible to data errors due to thermally-induced, random fluctuation of magnetic orientation known as the superparamagnetic effect.

Because the magnetic field applied during recording is typically much larger than the hotspot, the size of the hotspot defines the size of the recorded bits of data. As such, a HAMR device may incorporate a similar compensation scheme for off-center tracking, e.g., by changing a current applied to the laser instead of the write coil. As such, descriptions herein of write current, write coil current, etc., may also be understood to include laser current as an alternate for HAMR data storage devices.

Figure 6:
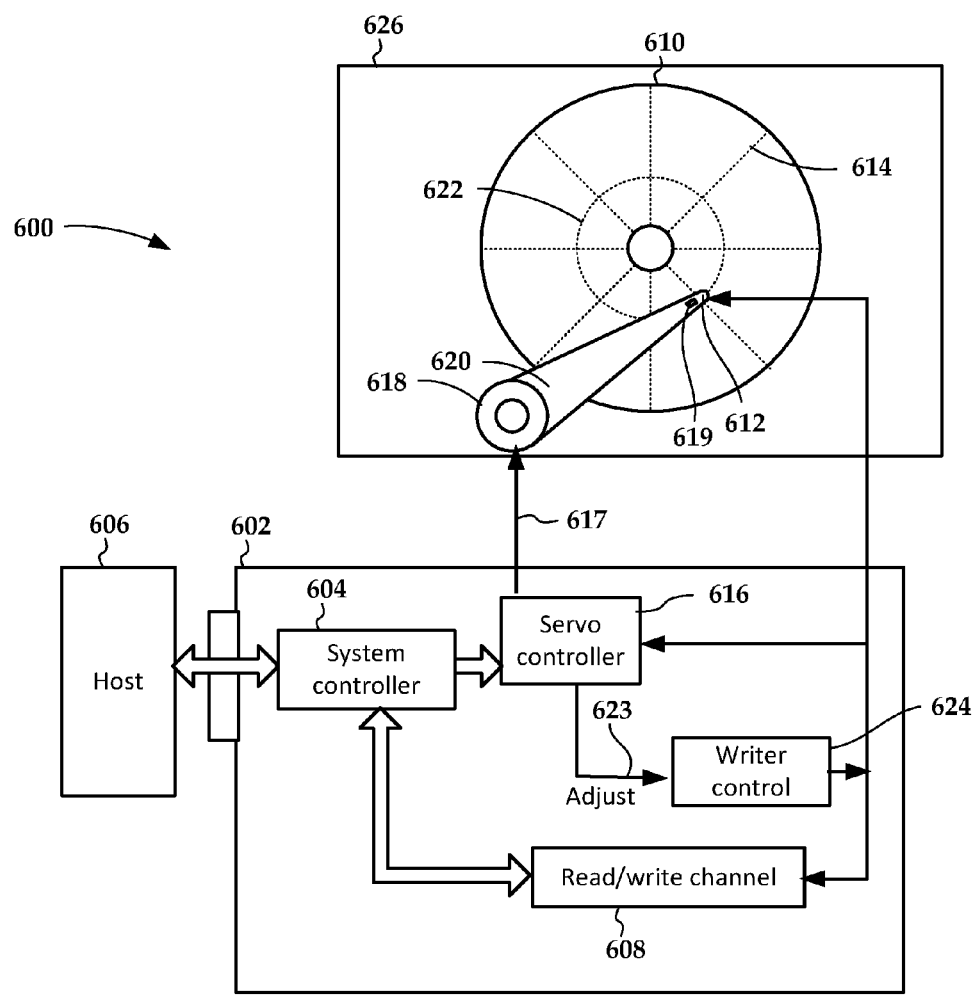
FIG. 6 is a block diagram of an apparatus according to an example embodiment.

In FIG. 6, a block diagram illustrates a data storage apparatus 600 according to an example embodiment. Control logic circuit 602 of the apparatus 600 includes a system controller 604 that processes read and write commands and associated data from a host device 606. The host device 606 may include any electronic device that can be communicatively coupled to store and retrieve data from a data storage device, e.g., a computer, peripheral card, etc. The system controller 604 is coupled to a read/write channel 608 that reads from and writes to a surface of a magnetic disk 610.

The read/write channel 608 generally converts data between the digital signals processed by the system controller 604 and the analog signals conducted through one or more read/write heads 612 during read operations. To facilitate the read operations, the read/write channel 608 may include analog and digital circuitry such as preamplifiers, filters, decoders, digital-to-analog converters, timing-correction units, etc. The read/write channel 608 also provides servo data read from servo wedges 614 on the magnetic disk 610 to a servo controller 616. The servo controller 616 uses these signals to provide a voice coil motor control signal 617 to a voice coil motor (VCM) 618. The VCM 618 rotates an arm 620 upon which the read/write heads 612 are mounted in response to the voice coil motor control signal 617. The control signal 617 may also be sent to a microactuator 619 that causes small-displacements of individual ones of the read/write heads 612.

Data within the servo wedges 614 is used to detect the location of a read/write head 612 relative to the magnetic disk 610. The servo controller 616 uses servo data to move a read/write head 612 to an addressed track 622 and block on the magnetic disk 610 in response to the read/write commands (seek mode). While data is being written to and/or read from the disk 610, the servo data is also used to maintain the read/write head 612 aligned with the track 622 (track following mode).

During writing, a writer controller 624 sends a control current to the read/write head 612. The current may be sent to a write coil that produces a magnetic field having strength relative to the amount of applied current. The servo controller 616 can send a signal 623 to the writer controller 624 to adjust an amount of write current based on a position error of the read/write head 612 that is currently writing data to the disk 610. The position error defines an offset from track center of a magnetic writer that is writing to a track on the disk 610. In response, the write controller adjusts a write current applied to a write coil of the writer to compensate for the offset, the adjusting of the write current affecting a width of the track.

In some embodiments, the apparatus 600 uses HAMR, and therefore the read/write heads 612 include an energy source (e.g., laser diode) that heats the magnetic disk 610 when recording. In such a configuration, the servo controller 616 determines an offset from track center of a magnetic writer that is writing to a track on the disk 610. In response, the write controller adjusts a laser power applied to a laser of the writer to compensate for the offset, the adjusting of the laser power affecting a width of the track.

Figure 7:
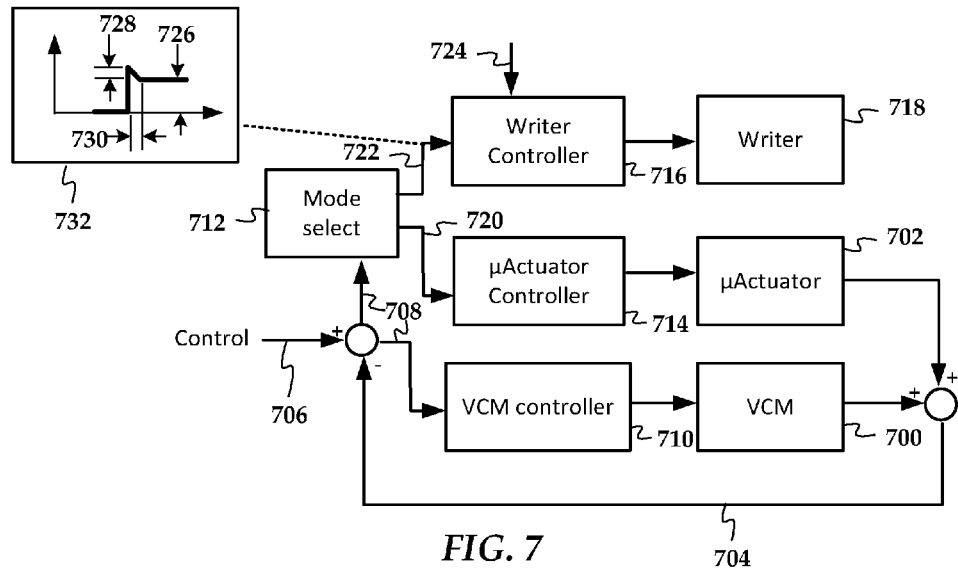
FIG. 7 is a block diagram of a servo control system according to an example embodiment.

In FIG. 7, a block diagram shows a servo control system according to an example embodiment. The control plant includes a VCM 700 and microactuator 702 that move a read/write head, thereby affecting a position signal 704 detected by the read/write head. The position signal 704 is combined with a control signal 706 to provide feedback 708 to the servo control system. The control signal 706 is set to zero for track following. The feedback 708 is input to a VCM controller 710 which conditions (e.g., filters, amplifies) the feedback 708 appropriately for the response characteristics of the VCM 700.

The feedback 708 is also shown input to a mode select block 712 that changes state in response to the read/write head being in a read or write mode. In a read mode, the mode select block 712 directs the feedback 708 to a microactuator controller 714 that conditions the feedback 708 appropriately for the response characteristics of the microactuator 702. In a write mode, the mode select block 712 directs the feedback 708 to both the microactuator controller 714 and a writer controller 716 that conditions the feedback 708 appropriately for the response characteristics of a writer 718. The writer 718 may include a write coil in conventional embodiments or an energy source (e.g., laser) in HAMR embodiments.

The mode select block 712 may perform signal processing on the feedback signal 708 so that the signals 720, 722 sent to the microactuator controller 714 and writer controller 716 are different. For example, the signal 720 sent to the microactuator controller 714 may be passed through a low-pass filter and the signal 722 sent to the writer controller 716 may be passed through a high-pass filter. In other embodiments, the signals 720, 722 may include an indicator of the current mode, in which case the microactuator controller 714 and a writer controller 716 can adjust their own states and filters accordingly depending on the mode.

During the writing, the writer 718 will be activated, e.g., by a write channel that energizes active components to change bits on the recording medium. As such, the signal 722 may cause a change in a currently generated write signal 724, e.g., originating from a write channel, or in the case of HAMR, originating from a laser driver. The possible changes to the write signal may include (as seen in the inset 732) any combination of a DC level 726, an overshoot magnitude 728, and an overshoot duration 730. Note that the change in the operation of the writer 718 does not change the position signal 708, as this is determined from reading pre-written servo marks by the reader, and changing width of the written tracks shouldn't affect relative position of the reader over the servo marks. As such, the writer 718 is operating in an open control loop mode, while the VCM 700 and microactuator are operating in a closed control loop mode.

In some embodiments, the off-center tracks may be caused by a repeatable runout. In such a case, the signal 722 sent to the writer controller 716 may be based on a predetermined set of measurements that define RRO correction for the current location. For example, one method of dealing with RRO involves measuring RRO over the entire disk during certification. These measurements are used to define virtual tracks that are more closely centered over the disk center than the physical tracks defined by the servo marks. This data can be fed into the servo control loop as a pseudo-feedback causing the read/write head to follow the virtual tracks instead of the physical tracks. The illustrated servo control system can use a similar approach to adjust track width via the writer 718 to compensate for high-frequency RRO. It will be understood there are many variations possible in a control system, and FIG. 7 is just one example. For example, if no microactuator 702 is used, then the mode selector 722 may just enable the writer 718 and may optionally modify signals sent to the VCM 700, e.g., low-pass filtering.

Figure 8:
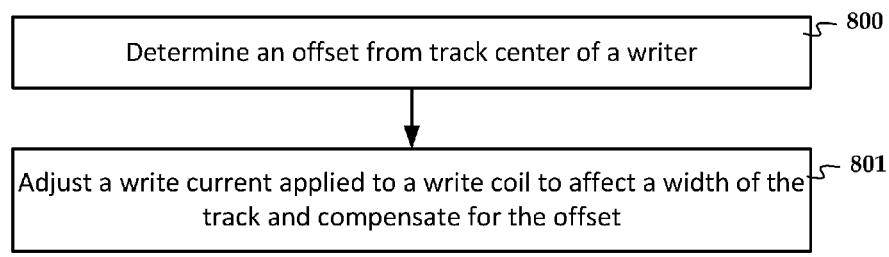
FIGS. 8 and 9 are flowcharts of methods according example embodiments.

In FIG. 8, a flowchart shows a method according to an example embodiment. The method involves determining 800 an offset from track center of a writer that is writing to a track of a recording medium. A write current applied to a write coil of the writer is adjusted 801 to compensate for the offset. The adjusting of the write current affects a width of the track.

Figure 9:
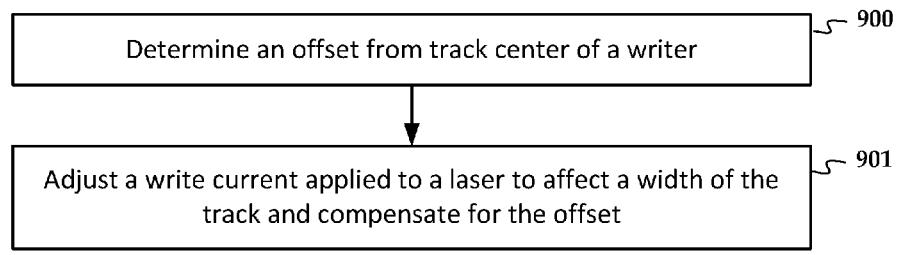

In FIG. 9, a flowchart shows a method according to another example embodiment. The method involves determining 900 an offset from track center of a writer that is writing to a track of a HAMR recording medium. A laser power applied to a laser of the writer is adjusted 901 to compensate for the offset. The adjusting of the laser power affects a width of the track.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. A method, comprising:
    positioning a read/write head over a track of a magnetic recording medium via a voice coil motor and a microactuator;
    determining an offset from track center of a writer of the read/write head that is writing to the track via a servo feedback signal from a reader of the read/write head; and
    based on a high frequency part of the servo feedback signal, adjusting a write current applied to a write coil of the writer to compensate for the offset, the adjusting of the write current affecting a width of the track, a low frequency part of the feedback signal being used to control the microactuator.

2. The method of claim 1, wherein the writer is writing shingled tracks to the magnetic recording medium.

3. The method of claim 1, wherein adjusting the write current comprises changing a DC level of the write current.

4. The method of claim 1, wherein adjusting the write current comprises changing one or more of an overshoot magnitude of the write current and an overshoot duration of the write current.

5. The method of claim 1, wherein the offset is caused by a repeatable runout, and wherein a previously measured value of the repeatable runout is used to determine the offset from track center.

6. The method of claim 1, wherein adjusting the write current to affect the width of the track comprises using a thermal sensor to compensate for write width changes due to temperature.

7. The method of claim 1, wherein the writer operates in an open servo control loop mode, and the microactuator and the voice coil motor operate in a closed servo control loop mode.

8. An apparatus comprising:
    interface circuitry configured to:
        write to a track of a magnetic recording medium via a writer of a read/write head;
        read a servo feedback signal from a reader of the read/write head that indicates a position of the read/write head over the track; and
        position the read/write head over tracks of the magnetic recording medium via control signals sent to a voice coil motor and a microactuator; and
    a controller coupled to the interface circuitry and configured to:
        determine an offset from track center of the track as it is written based on the servo feedback signal, a low frequency part of the servo feedback signal being used to control at least the microactuator; and
        based on a high frequency part of the servo feedback signal, adjust a width of the track to compensate for the offset.

9. The apparatus of claim 8, wherein the magnetic writer is writing shingled tracks to the magnetic recording medium.

10. The apparatus of claim 8, wherein adjusting the width of the track comprises adjusting a write current applied to a write coil of the writer.

11. The apparatus of claim 10, wherein adjusting the write current comprises changing one or more of a DC level, an overshoot magnitude, and an overshoot duration of the write current.

12. The apparatus of claim 8, wherein the recording medium comprises a heat-assisted magnetic recording medium, and adjusting the width of the track comprises adjusting a laser power used to heat the heat-assisted magnetic recording medium.

13. The apparatus of claim 8, wherein the offset is caused by a repeatable runout, and wherein a previously measured value of the repeatable runout is used to determine the offset from track center.

14. The apparatus of claim 10, wherein adjusting the write current to affect the width of the track comprises using a thermal sensor to compensate for write width changes due to temperature.

15. The apparatus of claim 8, wherein the writer operates in an open servo control loop mode, and the microactuator and the voice coil motor operate in a closed servo control loop mode.

16. A method, comprising:
   positioning a read/write head over a track of a heat-assisted magnetic recording medium via a voice coil motor and a microactuator;
   determining an offset from track center of a writer of the read/write head that is writing to the track via a servo feedback signal from a reader of the read/write head; and
   based on a high frequency part of the servo feedback signal, adjusting a laser power applied to a laser of the writer to compensate for the offset, the adjusting of the laser power affecting a width of the track, a low frequency part of the servo feedback signal being used to control the microactuator.

17. The god of claim 16, wherein the writer is writing shingled tracks to the recording medium.

18. The method of claim 16, wherein the offset is caused by a repeatable runout, and wherein a previously measured value of the repeatable runout is used to determine the offset from track center.

19. The method of claim 16, wherein the servo feedback signal is further used to control the voice coil motor.

20. The method of claim 16, wherein the writer operates in an open servo control loop mode, and the microactuator and the voice coil motor operate in a closed servo control loop mode.

* * * * *